United States Patent
Williams et al.

(10) Patent No.: US 10,684,107 B2
(45) Date of Patent: Jun. 16, 2020

(54) PROJECTILE

(71) Applicant: ROLLS-ROYCE plc, London (GB)

(72) Inventors: Christopher Williams, Loughborough (GB); James Finlayson, Ashby-de-la-Zouch (GB)

(73) Assignee: ROLLS-ROYCE PLC, London (GB)

(*) Notice: Subject to any disclaimer, the term of this patent is extended or adjusted under 35 U.S.C. 154(b) by 164 days.

(21) Appl. No.: 14/970,956

(22) Filed: Dec. 16, 2015

(65) Prior Publication Data
US 2016/0202030 A1 Jul. 14, 2016

(30) Foreign Application Priority Data
Jan. 8, 2015 (GB) .................................. 1500242.1

(51) Int. Cl.
| | | |
|---|---|---|
| *G01N 3/48* | (2006.01) | |
| *G01M 7/08* | (2006.01) | |
| *F42B 12/02* | (2006.01) | |
| *G01N 3/30* | (2006.01) | |
| *F42B 30/00* | (2006.01) | |
| *F42B 8/12* | (2006.01) | |

(52) U.S. Cl.
CPC .............. *F42B 12/02* (2013.01); *F42B 8/12* (2013.01); *F42B 30/00* (2013.01); *G01N 3/30* (2013.01)

(58) Field of Classification Search
CPC ............. F42B 12/74; G01N 3/48; G01M 7/08
See application file for complete search history.

(56) References Cited

U.S. PATENT DOCUMENTS

| | | | | |
|---|---|---|---|---|
| 1,162,183 A | | 11/1915 | Mixsell | |
| 2,368,210 A | | 1/1945 | Farr | |
| 2,405,308 A | * | 8/1946 | Jack ..................... | F42B 8/02 |
| | | | | 434/19 |
| 4,044,684 A | * | 8/1977 | Gaggini ................ | F42B 10/16 |
| | | | | 102/370 |
| 6,189,454 B1 | * | 2/2001 | Hunt ..................... | F42B 12/74 |
| | | | | 102/444 |

(Continued)

FOREIGN PATENT DOCUMENTS

| | | | | |
|---|---|---|---|---|
| DE | 30 44 098 A1 | | 9/1981 | |
| DE | 3044098 A1 | * | 9/1981 | .............. F42B 8/12 |
| EP | 2 172 734 A1 | | 4/2010 | |

(Continued)

OTHER PUBLICATIONS

May 17, 2016 extended Search Report issued in European Patent Application No. 15200126.9.

(Continued)

*Primary Examiner* — Jill E Culler
*Assistant Examiner* — Ruben C Parco, Jr.
(74) *Attorney, Agent, or Firm* — Oliff PLC

(57) ABSTRACT

The present invention provides a projectile for use in a simulated fan-blade-off ballistic test. The projectile has an ellipsoid body having a blind axial bore extending from a first axial end. The blind axial bore is for housing a weight adjustment body which can be used to modify the weight and/or centre of gravity of the projectile. A sealing plug may seal the weight adjustment body within the axial bore and an insert may be provided to fix the position of the weight adjustment body and/or to control the sliding of the weight adjustment body within the axial bore.

13 Claims, 2 Drawing Sheets

(56) References Cited

U.S. PATENT DOCUMENTS

| | | | | |
|---|---|---|---|---|
| 6,267,698 B1* | 7/2001 | Orav | ............... | F42B 6/003 473/578 |
| 2008/0090684 A1* | 4/2008 | Martinez | ............. | F42B 6/003 473/578 |

FOREIGN PATENT DOCUMENTS

| | | |
|---|---|---|
| FR | 1 320 263 A | 3/1963 |
| GB | 2 115 118 A | 9/1983 |
| WO | 2007/053130 A1 | 5/2007 |

OTHER PUBLICATIONS

Jun. 2, 2015 British Search Report issued in British Patent Application No. 1500242.1.

* cited by examiner

PROJECTILE

FIELD OF THE INVENTION

The present invention relates to a projectile for use in an improved fan-blade-off ballistic simulation test method.

BACKGROUND OF THE INVENTION

The aviation authority requires that gas turbine engine casings must be capable of containing the release of a single or multiple compressor or turbine blade(s). The "fan-blade-off" test is a single-shot test where a projectile is released explosively and the mechanical integrity of all systems and the containment capability of the engine casing is assessed following the projectile release.

The projectile is typically a fan blade (full sized or scaled) or a fan blade fragment.

The test may be an engine test or a rig test which are expensive and require long lead times. Often a reduced cost but complex ballistic test is used to simulate the fan-blade-off-test.

These known ballistic test methods fail to take account of the nature of blade impact in terms of impact angle and loading. In real-life fan-blade-off incidents, the blade impact comprises a highly oblique initial impact of the blade body followed by a second highly oblique impact of the root portion of the blade. Ballistic tests often fail to replicate these impact angles and feature projectiles which permanently deform unrepresentatively due to differences between a rotating and linearly translating projectile.

The present invention aims to provide an improved projectile for use in simulated fan-blade-off tests, where the projectile accurately simulates the nature of a blade impact.

SUMMARY OF THE INVENTION

In a first aspect, the present invention provides a projectile for use in a simulated fan-blade-off ballistic test, wherein the projectile has an ellipsoid body having a blind axial bore extending from a first axial end, the blind axial bore for housing a weight adjustment body.

By using a projectile having an axial bore that can house a weight adjustment body, the projectile is able to simulate different sizes of blades and different phases of the fan-blade-off event. The weight adjustment body can be used to modify the weight and/or centre of gravity of the projectile. The ellipsoid shape produces a double impact as first the nose of the projectile impacts followed by the tail and increases the energy density of impact for a given gun barrel diameter. The ellipsoid also provides greater stability of the projectile during flight and prevents tumbling. The ellipsoid shape also provides representative local liner deformation closely simulating that from interaction with the fan blade.

Optional features of the invention will now be set out. These are applicable singly or in any combination with any aspect of the invention.

In some embodiments, the projectile further includes at least one weight adjustment body within the axial bore and a sealing plug for sealing the axial bore.

In some embodiments, the ellipsoid body is truncated at the first axial end to allow forming of the bore without affecting the interaction of the projectile on the target.

In some embodiments, the sealing plug is for sealing the axial bore at the truncated first axial end. The sealing plug may be shaped to restore the ellipsoid projectile shape.

In other embodiments, the sealing plug is insertable into and contained within the axial bore.

The axial length of the ellipsoid body (i.e. the distance from the first axial end to a second axial end) may be around 170 mm. However, the axial length can be selected to create the required time separation between the initial and secondary impacts to represent blade body and root impacts.

The length of the axial bore (i.e. the distance from the first axial end to the blind end of the bore may be around 164 mm (e.g. for an ellipsoid body having an axial length of around 170 mm). The bore length is maximised to produce the greatest range of movement of the at least one weight adjustment body within the bore.

The diameter of the ellipsoid body (which may be around half of the axial length of the ellipsoid body) may be around 90 mm.

The diameter of the axial bore may be around 27 mm. The axial bore may have an enlarged diameter section (e.g. having a diameter around 35 mm) proximal the first axial end which may be for receiving the sealing plug. An intermediate diameter section may be provided between the enlarged diameter section and the main axial bore. This intermediate diameter section may be threaded for mating with a corresponding thread on the sealing plug or on the at least one weight adjustment body.

The ellipsoid body may be formed of metal e.g. aluminium or an aluminium alloy.

In some embodiments, the ellipsoid body has an outer surface provided with a coating e.g. a paint coating. The paint coating may be a pale-coloured/white, matt coating. The coating may be provided with a grid of axially-extending and circumferentially-extending lines. This allows for easy observation of the projectile after release.

In some embodiments, the projectile further includes at least one insert housed within the axial bore between the blind end of the axial bore and the weight adjustment body.

In some embodiments, the insert(s) may be provided for fixing (at least temporarily) the position of the weight adjustment body within the axial bore. For example, the insert may be one or more spacers or locking rings positioned between the blind end of the axial bore and the weight adjustment body. The insert may fix the weight adjustment body (at least temporarily) in abutment with the sealing plug.

In some embodiments, the insert may be provided for controlling sliding movement of the weight adjustment body within the axial bore. In these embodiments, the insert may be deformable/compressible or may comprise a deformable/compressible portion. For example, the insert may be one or more spacers/rings formed of or having a portion formed of one or more of a crushable material, a resiliently deformable (compressible) material/device (e.g. an elastomeric material or spring) and a damping material/device. The spring constant of the resiliently deformable material/device and/or damping coefficient of the damping material'/device can be selected to control the sliding characteristics of the weight adjustment body within the axial bore.

In some embodiments, the insert itself may be moveable in a controlled manner within the axial bore. For example, the insert may be a high frictional device which initially fixes the weight adjustment body e.g. in abutment with the sealing plug (by virtue of the high frictional resistance between the device and the walls of the axial bore) but then allows controlled movement of the weight adjustment body within the axial bore when forces on the weight adjustment body during impact of the projectile exceed the frictional resistance of the friction device.

By allowing controlled movement of the weight adjustment body within the axial bore using one or more insert which is deformable or has a deformable portion or using a high friction device, controlled movement of the projectile's centre of gravity is achieved which can be used to control the impact forces of the projectile. By initially positioning the slidable weight adjustment body proximal the first axial end (e.g. in abutment with the sealing plug), the weight adjustment body will remain in its initial position until impact and then, once impact forces on the weight adjustment body are sufficiently high, the weight adjustment body will slide away from the first axial end (towards the second axial end) towards the closed end of the blind bore. The dynamic movement of the projectile's centre of gravity and impact of the weight adjustment body against the blind bore end will simulate a blade impact kinematics. Modification of the sliding distance of the weight adjustment body within the bore (e.g. by modification of the length of the axial bore and/or selection of an insert having an appropriate axial length and/or appropriate deformation/frictional resistance characteristics) can be used to modify the time between the two impacts to accurately simulate the two impacts for different blades.

The weight adjustment body may be formed of a dense material such as a tungsten alloy. The weight adjustment body preferably has an axial length that is less than the axial length of the axial bore.

In a second aspect, the present invention provide a kit for use in a simulated fan-blade-off ballistic test, the kit comprising:

a projectile according to the first aspect;
at least one weight adjustment body; and
a plug for sealing the blind bore at the first axial end.

In some embodiments, the kit comprises a plurality of weight adjustment bodies of differing masses.

In some embodiments, the kit comprises a plurality of inserts. The inserts may have differing axial lengths and/or differing deformation (compression)/frictional resistance characteristics.

The or each weight adjustment body/insert is as described above for the first aspect.

In some embodiments, the sealing plug has a threaded shaft.

In a third aspect, the present invention provides a simulated fan-blade-off method comprising:

firing a projectile according to the first aspect towards a test item to be impacted; and
assessing damage to the test item after impact of the projectile.

In some embodiments, the method comprises using a gas gun to fire the projectile at the test item. The gas gun can be used to fire the projectile at speeds representative of the different phases of the fan-blade-off impact e.g. up to speeds of 250 m/s.

In some embodiments, the method comprises using a sabot to minimise retardation of the projectile and to reduce debris. The ellipsoid shape of the projectile facilitates sabot release.

In some embodiments the method comprises measuring the speed of projection of the projectile after firing e.g. using a light curtain.

In some embodiments, the method comprises monitoring the projection and impact of the projectile after firing e.g. using a camera.

In some embodiments, the method comprises providing a grid and/or a speckle paint coating on the test item to be impacted to highlight any distortion during impact.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
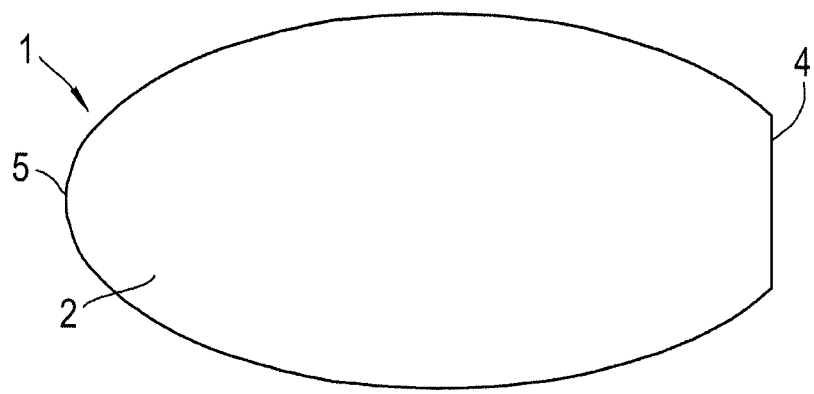
FIG. 1 shows a lateral view of a first embodiment of the present invention.
Figure 2:
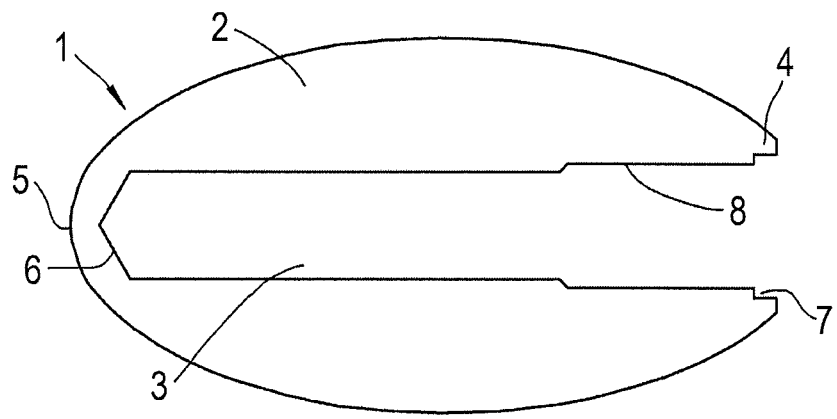
FIG. 2 shows an axial cross-section through the first embodiment.
Figure 3:
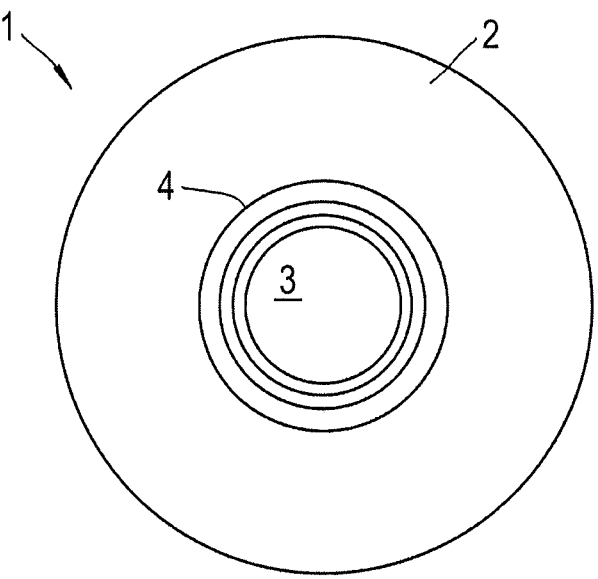
FIG. 3 shows a radial cross-section through the first embodiment.
Figure 4:
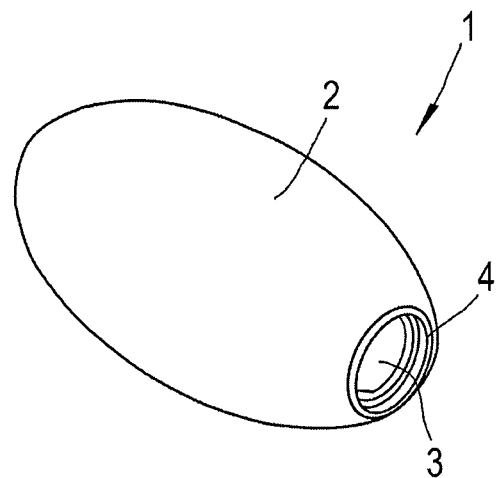
FIG. 4 shows a perspective view of the first embodiment.

FIGS. 1 to 5 show a projectile 1 for use in a simulated fan-blade-off ballistic test. The projectile has an ellipsoid body 2 having a blind axial bore 3 extending from a first axial end 4, the blind axial bore 3 for housing a weight adjustment body 9 (shown in FIGS. 5 and 6).

The first axial end 4 is truncated where the axial bore is formed.

The axial length of the ellipsoid body 2 (i.e. the distance from the first axial end 4 to the second axial end 5) is around 170 mm.

The length of the axial bore 3 (i.e. the distance from the first axial end 4 to the blind end 6 of the bore 3 is around 164 mm.

The diameter of the ellipsoid body 2 is around 90 mm.

The diameter of the axial bore 3 is around 26.6 mm. The axial bore 3 has an enlarged diameter section 7 (e.g. having a diameter around 35 mm) proximal the first axial end 4. An intermediate diameter section 8 is provided between the enlarged diameter section 7 and the main axial bore 3. The intermediate section 8 is threaded for cooperating with a corresponding thread on the sealing plug 10 (shown in FIGS. 5 and 6). The sealing plug 10 is contained within the axial bore although in other embodiments, it could have an external portion which is positioned at the truncated first axial end 4 to form the projectile into a complete ellipsoid shape.

The ellipsoid body 2 is formed of aluminium. The weight adjustment body 9 is formed of tungsten alloy.

The aluminium projectile shown in FIGS. 1 to 4 has a mass of 1.84 kg with the centre of gravity located 81.2 mm from the first axial end 4.

The ellipsoid body 2 has an outer surface provided with a pale-coloured/white, matt paint coating. The coating is provided with a grid of axially-extending and circumferentially-extending lines. The grid comprises four equally-spaced axially-extending lines and three equally spaced circumferentially-extending lines with the central circumferentially extending line extending around the position of the centre of gravity of the projectile (with the other two lines spaced 40 mm either side of the central line). This allows for easy observation of the projectile after release as discussed below.

Figure 5:
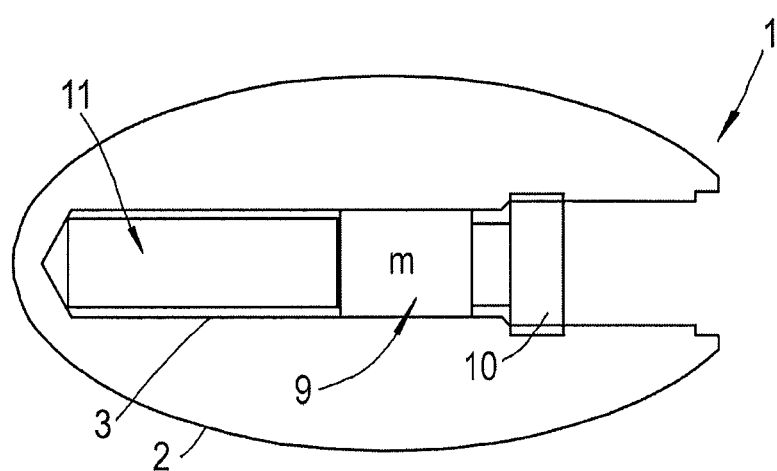
FIG. 5 shows an axial cross-section through the first embodiment with an insert, weight adjustment body and sealing plug in situ.

As shown in FIG. 5, an insert 11 is provided in the axial bore between the weight adjustment body 9 and the blind end 6 of the axial bore 3. The insert 11 initially holds the weight adjustment body in abutment with the sealing plug 10. The insert 11 is formed of a deformable material e.g. a resiliently compressible elastomeric material having a spring constant which can be selected to control the ease of deformation/compression of the insert.

Figure 6:
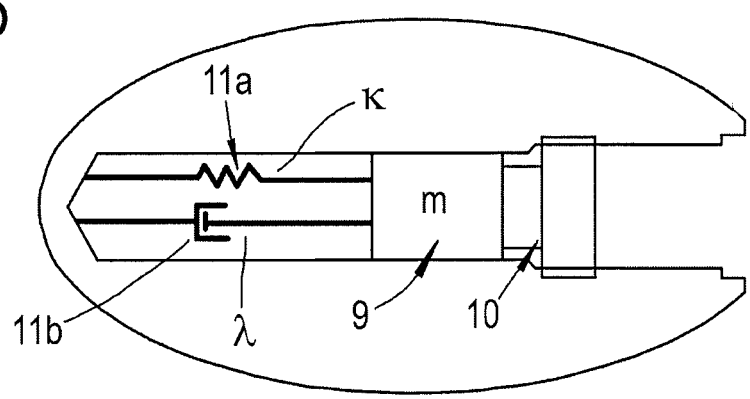
FIG. 6 shows an alternative insert.

FIG. 6 shows an alternative insert which comprises a spring portion 11a and a damping mechanism 11b.

In use, the projectile 1 is loaded into a gas gun and a sabot is provided around the projectile.

The projectile 1 is fired from the gas gun at a speed up to 250 m/s towards a test item. The speed of projection of the projectile 1 after firing is measured using a light curtain. The projection and impact of the projectile after firing is monitored using a camera. The paint coating and gridded lines on the outer surface of the ellipsoid body 2 facilitates this camera monitoring. The camera is also used to monitor distortion of the test item during impact. A grid and/or speckle paint coating on the test item highlights any distortion during impact.

Before impact, the weight adjustment body 9 is held in abutment with the sealing plug 10 by the insert 11, 11a, 11b. The weight adjustment body will remain in its initial position until impact and will then slide away from the first axial end 4 (towards the second axial end 5) towards the closed end of the blind bore 6. The impact of the weight adjustment body against the blind bore end 6 (via the insert) will simulate the second impact by the blade root portion.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

The invention claimed is:

1. A projectile for use in a simulated fan-blade-off ballistic test, the projectile having an open axial end and a closed axial end, the projectile being projected toward a target with the open axial end as a tail side of the projectile and the closed axial end as a nose side of the projectile, the projectile comprising:
   an ellipsoid body having a blind axial bore extending from the open axial end of the projectile to a blind end of the blind axial bore, the blind axial bore extending for a majority of an entire axial length of the projectile;
   at least one weight adjustment body housed within the blind axial bore separated from the blind end of the blind axial bore; and
   at least one insert housed within a space between i) the blind end of the blind axial bore and (ii) an end of the at least one weight adjustment body closest to the blind end in an axial direction of the blind axial bore,
   the at least one insert being made of a resiliently deformable elastomeric material with a spring constant, the spring constant being selected to control a sliding movement of the at least one weight adjustment body in the axial direction, such that upon impact of the nose side of the projectile on the target, the end of the at least one weight adjustment body moves further toward the blind end of the blind axial bore by compressing the at least one insert.

2. The projectile according to claim 1, wherein the at least one weight adjustment body is slidable within the blind axial bore.

3. The projectile according to claim 1, further comprising a sealing plug for sealing the blind axial bore.

4. The projectile according to claim 1, wherein the ellipsoid body is formed of aluminium or an aluminium alloy.

5. A kit for use in a simulated fan-blade-off ballistic test, the kit comprising:
   the projectile according to claim 1; and
   a plug for sealing the blind axial bore at the open axial end.

6. The kit according to claim 5, further comprising
   a plurality of weight adjustment bodies of differing masses.

7. The kit according to claim 5, further comprising
   a plurality of inserts of differing axial lengths and/or differing deformation properties and/or differing frictional resistance properties.

8. A simulated fan-blade-off ballistic test method comprising:
   firing a projectile towards a test item to be impacted, the projectile having an open axial end and a closed axial end, the projectile being projected toward the test item with the open axial end as a tail side of the projectile and the closed axial end as a nose side of the projectile, the projectile comprising:
      an ellipsoid body having a blind axial bore extending from the open axial end of the projectile to a blind end of the blind axial bore, the blind axial bore extending for a majority of an entire axial length of the projectile;
      at least one weight adjustment body housed within the blind axial bore separated from the blind end of the blind axial bore; and
      at least one insert housed within a space between (i) the blind end of the blind axial bore and (ii) an end of the at least one weight adjustment body closest to the blind end in an axial direction of the blind axial bore,
      the at least one insert being made of a resiliently deformable elastomeric material with a spring constant, the spring constant being selected to control a sliding movement of the at least one weight adjustment body in the axial direction, such that upon impact of the nose of the projectile on the target, the end of the at least one weight adjustment body moves further toward the blind end of the blind axial bore by compressing the at least one insert; and
   assessing damage to the test item after impact of the projectile.

9. The projectile according to claim 1, wherein the at least one weight adjustment body slides away from the open axial end of the projectile towards the blind end of the blind axial bore.

10. The projectile according to claim 1, wherein
    the entire axial length of the projectile is approximately 170 mm, and
    an entire axial length of the blind axial bore is approximately 164 mm.

11. The projectile according to claim 1, wherein the blind axial bore has:
    a first diameter section disposed at the open axial end,
    a second diameter section disposed inward of the first diameter section and having a diameter smaller than a diameter of the first diameter section, and
    a third diameter section disposed inward of the second diameter section and having a diameter smaller than the diameter of the second diameter section.

12. The projectile according to claim 1, wherein the blind axial bore is sealed so that the at least one weight adjustment body flies with the projectile and slides within the blind axial bore upon an impact of the projectile after the flight.

13. The projectile according to claim 1, further comprising:
paint coatings or gridded lines on an outer surface of the projectile that are monitored by a camera as the projectile is projected and impacted on the target.

\* \* \* \* \*